March 2, 1971  F. V. GUERRERO  3,566,443
MOLDING DEVICE

Filed Feb. 6, 1969  3 Sheets-Sheet 1

INVENTOR.
FERNANDO V. GUERRERO
BY

ATTORNEY

INVENTOR.
FERNANDO V. GUERRERO
ATTORNEY

United States Patent Office 3,566,443
Patented Mar. 2, 1971

3,566,443
MOLDING DEVICE
Fernando V. Guerrero, Chagrin Falls, Ohio, assignor to Continental Oil Company, Ponca City, Okla.
Filed Feb. 6, 1969, Ser. No. 796,963
Int. Cl. B29c 5/04
U.S. Cl. 18—26                3 Claims

ABSTRACT OF THE DISCLOSURE

Device for rotating a mold on two perpendicular axes while simultaneously transporting it, e.g. through sequential loading, heating, cooling, and unloading zones, useful for molding large hollow objects.

---

This invention relates to apparatus for molding hollow objects. In one aspect, the invention relates to a device for effecting rotation of a mold about two perpendicular axes while simultaneously translating the mold.

There has recently arisen a need for producing, on a large scale, hollow molded objects from the thermoplastic or thermosetting plastics. Although such techniques as blow molding, injection molding, and vacuum forming are available, these are all unsuitable for certain applications, such as manufacture of a one-piece gasoline tank for an automobile. Rotational molding has accordingly come to the fore; this involves charging a mold with the proper amount of molding powder and then, while continuously spinning the mold about two perpendicular axes, heating the mold to obtain fusion or curing followed by cooling the mold. These steps have bene accomplished by a batch operation whereien the mold rotating mechanism is placed in an enclosure which is sequentially loaded, heated, cooled and unloaded; such procedure is inefficient and time-consuming. Although there are continuous rotational molding machines on the market, their operating cycles are relatively inflexible, i.e. the ratio of heating to cooling to loading and unloading time is fixed, or only changeable with great difficulty.

It is accordingly an object of the invention to provide apparatus for rotating a mold about two perpendicular axes while simultaneously transporting it, for example, through a series of zones. Other aspects, objects, and the several advantages of the invention will become apparent upon study of this disclosure, the appended claims, and the drawing, in which:

Figure 1:
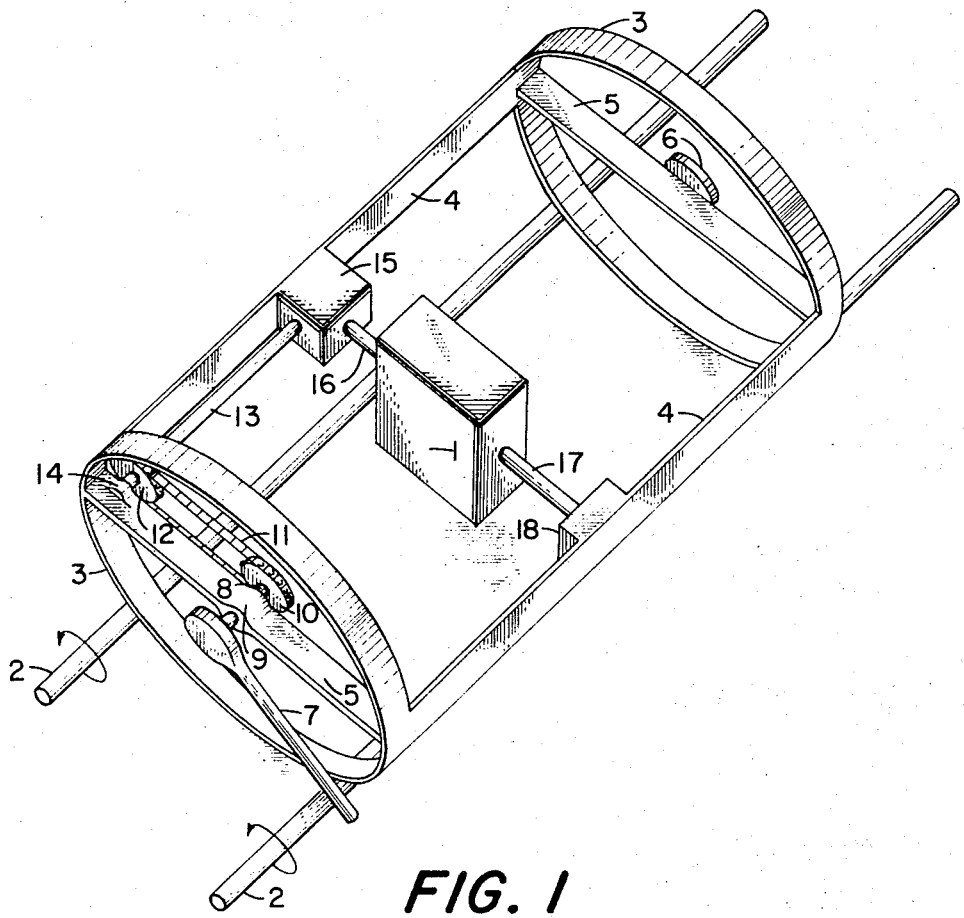
FIG. 1 is a schematic representation of a transport vehicle according to this invention.

The invention will now be explained by reference to the drawing. FIG. 1 illustrates a transport vehicle which spins a mold box 1 about two perpendicular axes simultaneously, and which can be transported longitudinally along a pair of rollers 2 by being slid along them. One or both or rollers 2 are powered by suitable means not shown to provide rotation as shown. The vehicle comprises a pair of hoops 3 which are spaced apart by two or more longitudinal braces 4. Each hoop 3 is strengthened by one or more transverse members 5. One end of the vehicle can be provided with a bumper 6, preferably mounted on a bearing, not shown, on its transverse member. The other end of the vehicle is provided with a drive mechanism for biaxial rotation of mold box 1. This mechanism comprises an anti-rotation bar 7 which can also serve as a bumper, a shaft 8 which is mounted in bearings 9 at the center of the hoop, a sprocket 10, a drive chain 11, and a sprocket 12 which is mounted on a shaft 13 between a bearing 14 and a right-angle drive 15. Mold box 1 is supported at one end by a shaft 16 from drive 15, and at the other end by a shaft 17 mounted in a bearing 18. Drive 15 and bearing 18 can conveniently be mounted on longitudinal braces 4.

Operation of the vehicle of FIG. 1 is as follows. One or both of rollers 2 is rotated, as by an electric motor, which causes the entire vehicle to roll or rotate about its longitudinal axis on hoops 3, which are supported on both rollers 2. Traction can be increased to effect more efficient power transfer from the rollers to the hoops, if desired, by providing longitudinal knurls or serrations to rollers 2 and to the outer faces of hoops 3. As the vehicle rolls in place, anti-rotation bar 7 will encounter one of the rollers 2, which causes shaft 8 and sprocket 10 to remain stationary. The vehicle continues to rotate about the axis of shaft 8, so that stationary sprocket 10 causes drive chain 11 to rotate sprocket 12. This in turn causes drive 15 to rotate the mold box 1 about the axis defined by shafts 16 and 17. Thus it is seen that mold box 1 is simultaneously rotated about the axis defined by shaft 8 and the axis defined by shafts 16 and 17. The vehicle can be transported longitudinally of rollers 2 by simply being pushed, either at bumper 6 or at bar 7, without interrupting its biaxial rotation.

Figure 2:
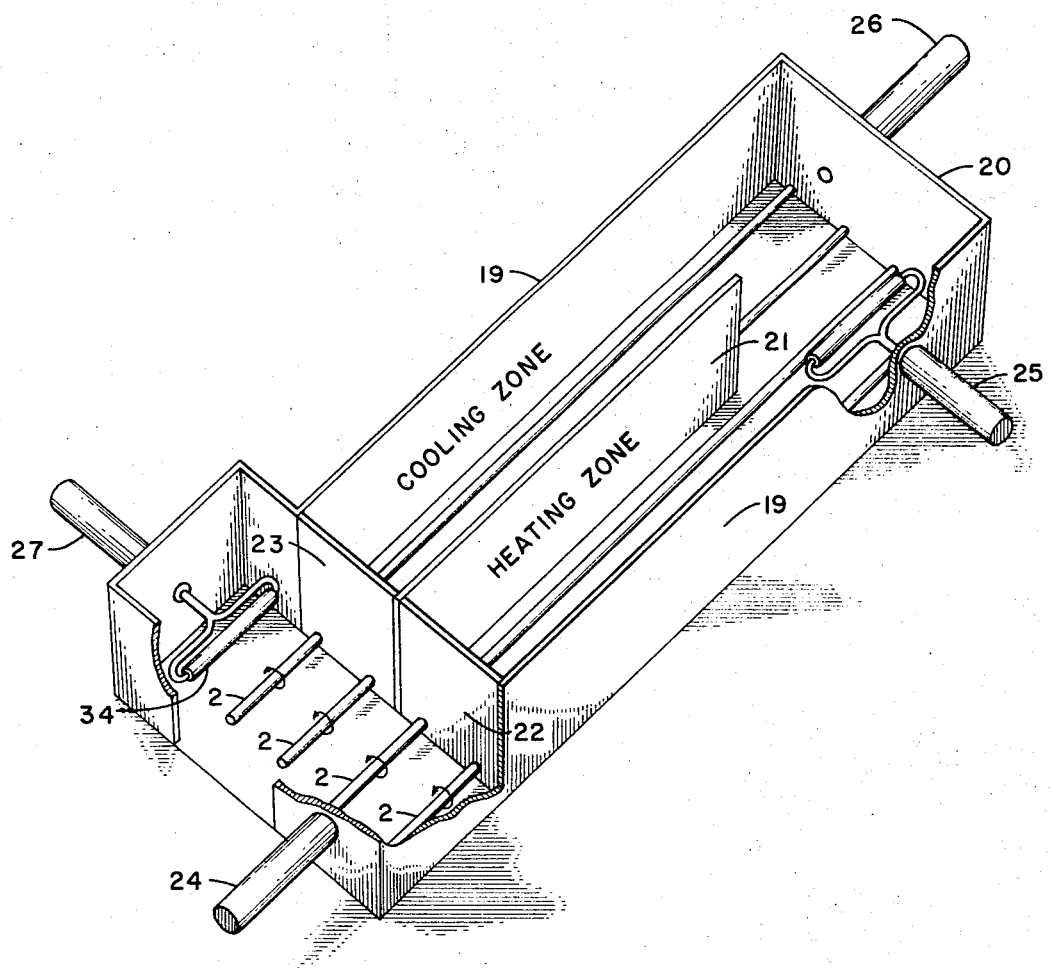
FIG. 2 is a diagram of a molding installation utilizing the transport vehicle of the invention.

Referring now to FIG. 2, there is shown one embodiment of a transport system using the vehicle of FIG. 1. The system comprises two pairs of rollers 2 mounted on suitable bearings, not shown, which rollers extend the entire length of the device, and project outwardly thereof at one end. A housing comprising side walls 19, an end wall 20, an inner partition 21, inlet door 22, exit door 23, and a roof (removed for clarity) contains heating and cooling zones as shown. Heating can be effected electrically, by steam, or by other suitable means, and cooling can be by water sprays or otherwise as desired. A pair of hydraulic cylinders are mounted so as to face respectively inlet door 22 and longitudinally at the end of the cooling zone; the latter cylinder 26 can conveniently be mounted on end wall 20, while the former 24 must be mounted at least the length of a transport vehicle from inlet door 22. A second pair of hydraulic cylinders are mounted at right angles to rollers 2, one 27 at the protruding ends of rollers 2 outside the housing, and the other 25 facing the opening left at the end of partition 21; these can be provided with an idler roller 34.

Operation of the molding system of FIG. 2 will now be described. A plurality of the vehicles of FIG. 1, such as ten or twelve, are positioned along both sets of rollers 2 throughout the heating zone and the cooling zone; one vehicle is positioned on the rollers outside the housing at inlet door 22. The mold in this latter vehicle has been previously charged with molding powder. Both pairs or rollers 2 are rotating. Cylinder 24 is actuated, and pushes against either bumper 6 or bar 7 of the vehicle just loaded; door 22 has of course been opened. This pushes the vehicle into the heating zone, and this vehicle in turn pushes the other vehicles in the heating zone along the rollers toward end 20. Actuation of cylinder 26 pushes the vehicles along the rollers in the cooling zone until one emerges through exit door 23. Cylinder 25 is then actuated to push the last vehicle in the heating zone through the opening at the end of partition 21 onto the pair of rollers 2 in the cooling zone. The vehicle emerging from exit door 23 is lifted so as to disengage from rollers 22, as by a hoist having idler rollers thereon, and allowed to stop rotating, at which time its mold is emptied. This vehicle is then moved across, as by cylinder 27, to a position between cylinder 24 and door 22, and above rollers 2. Its mold is then charged with molding powder and it is lowered onto the rollers. The plurality of vehicles are thus pushed through the cycle from the mold loading zone in front of door 22, through the heating zone, the cooling zone, and to the mold unloading zone outside door 23. Residence time in the varius zones will obviously depend on the number and size of vehicles, the length of the zones, and the frequency of actuation of cylinders 24, 25, 26 and 27. Each vehicle progresses, here counter-clockwise, through the cycle, with biaxial rotation of the mold at all times except during its loading and unloading.

Figure 3:
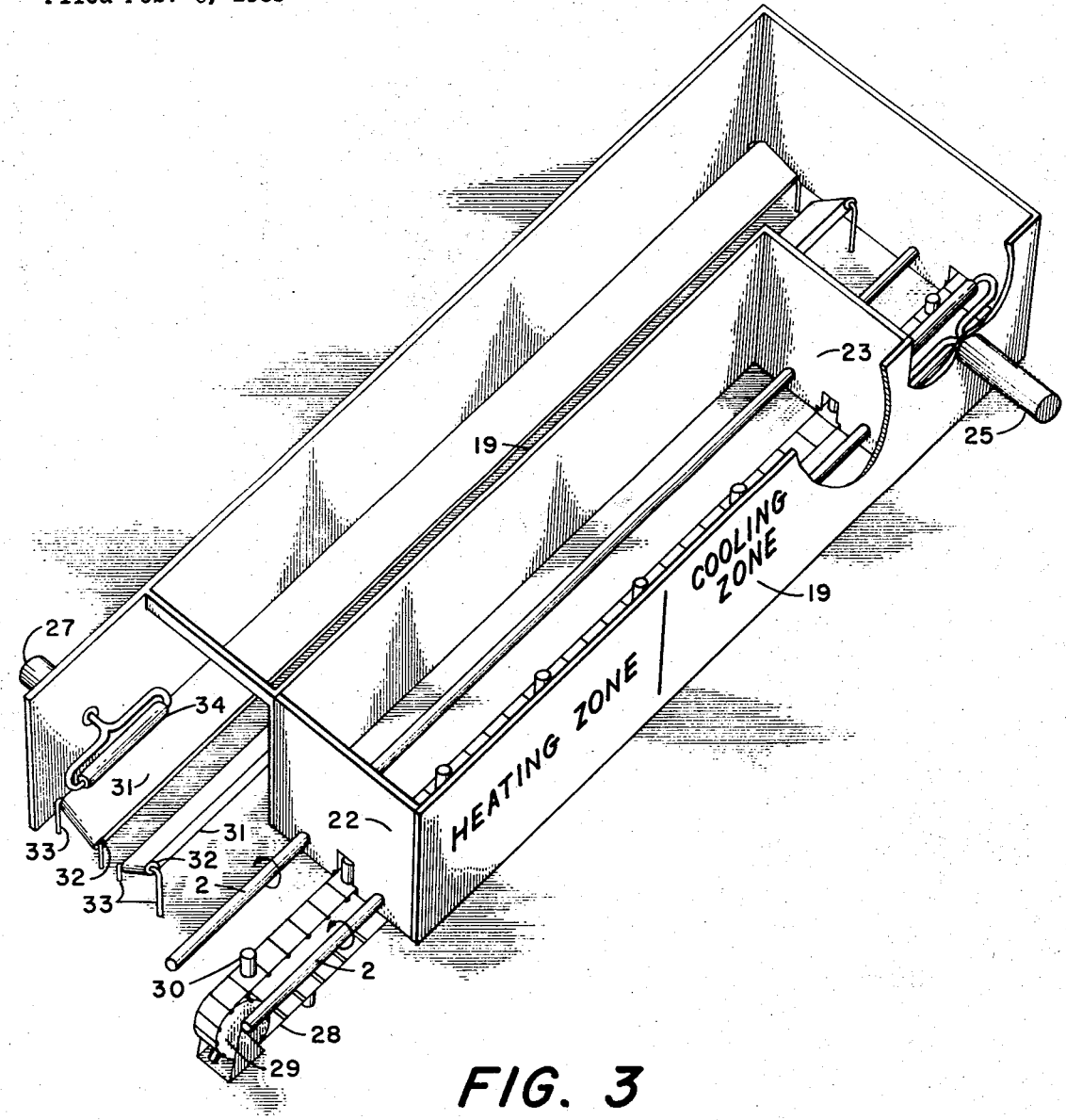
FIG. 3 is a diagram incorporating two additional embodiments of transport system utilizing the transport vehicle of the invention.

Referring next to FIG. 3, there is shown another embodiment of transport system, wherein the heating and cooling zones are in a straight line. This system comprises a pair of rollers 2, and a chamber comprising inlet door 22, outlet door 23, and side walls 19. A belt or chain 28 driven by a pulley or motor 29 traverses the length of the chamber, and has mounted thereon on bearings a plurality of idler rollers 30. A pair of conveyor belts 31, arranged in a shallow V, are driven by rollers 32 and supported on legs 33. Cylinders 25 and 27, and idler rollers 34, are as in FIG. 2.

The operation of the system of FIG. 3 is as follows. A mold vehicle of the type of FIG. 1, charged with molding powder, is placed on rollers 2 just outside inlet door 22. It begins its biaxial rotation, and chain 28 is then actuated for a sufficient distance that one of its idler rollers 30 pushes the loaded vehicle through inlet door 22; this vehicle in turn pushes those ahead of it through the chamber for a distance of one vehicle length. As a vehicle emerges from exit door 23, it is pushed by cylinder 25 onto the far end of belts 31, and begins its return by way of conveyor belts 31 back to a position adjacent the inlet door 22. During this return, the mold is unloaded and recharged; it is then ready to be pushed from belts 31 onto rollers 2 by cylinder 27 and take its place outside inlet door 22, completing a cycle.

In dual-axis rotational molding, the rotational rate around the two axes is usually different, e.g. rotation may be at 10 r.p.m. around one axis and 30 r.p.m. around the other. This is controlled by the ratio of sizes of sprockets 10 and 12, and the speed of rollers 2. The time for which a mold is subjected to the heating and cooling cycles will depend upon the type and thickness of plastic being molded and the heating and cooling temperatures available. These cycles are controlled by the length of the heating and cooling zones, the length of the vehicles, and the rate at which vehicles are pushed along rollers 2. Once a given heating and cooling zone has been constructed, cycle times can be adjusted, for example, by varying the frequency of pushing by cylinders 24–37 in FIG. 2, or by idler rollers 30 in FIG. 3, or by varying vehicle length as by changing the length of an extension, not shown, protruding from bumper 6. A typical heating cycle time for high-density polyethylene of ¼" wall thickness is about 15 minutes, with cooling requiring 5 minutes or less, and unloading and reloading each of the order of 5 minutes. Thus, 6 vehicles can be within the heating zone, and 2 vehicles each in the cooling, unloading and reloading zones, with the vehicles being pushed along rollers 2 one vehicle-length each 150 seconds.

While particular embodiments of the invention have been described, it will be understood, of course, that the invention is not limited thereto, since many modifications may be made; and it is, therefore, contemplated to cover by the appended claims any such modification as falls within the true spirit and scope of the invention.

What is claimed is:
1. A device for spinning a mold about two substantially perpendicular axes while simultaneously transporting said mold from one locus to another which comprises:
    (a) a pair of elongated, substantially parallel rollers tranversing said loci, at least one of said rollers being rotatable by application of a power source,
    (b) a plurality of wheel means in substantially parallel planes, and of a diameter to span the distance between said rollers,
    (c) brace means connecting at least two of said wheel means in substantially coaxial relationship,
    (d) drive means for transmitting rotational motion about the axis of step (c) from outside the periphery of said wheel means to within said periphery,
    (e) right-angle power transmission means for effecting rotational motion about an axis substantially perpendicular to that of step (c) responsive to said drive means,
    (f) mold means mounted on the axis of step (e), and
    (g) transport means for moving said wheel means in the direction of the axis of step (c) longitudinally of said rollers.
2. The device of claim 1 wherein said transport means comprises ram means for pushing one of said wheel means at the axis of step (c).
3. The device of claim 1 wherein said transport means comprises conveyor means for pushing one of said wheel means at its periphery.

References Cited

UNITED STATES PATENTS

| | | | |
|---|---|---|---|
| 3,003,188 | 10/1961 | Weiss | 18—26 |
| 3,134,140 | 5/1964 | Knowles | 18—26 |
| 3,315,314 | 4/1967 | Barnett et al. | 18—26 |

J. SPENCER OVERHOLSER, Primary Examiner

L. R. FRYE, Assistant Examiner